(12) United States Patent
Maisonnette et al.

(10) Patent No.: US 11,401,148 B2
(45) Date of Patent: Aug. 2, 2022

(54) AERIAL-LIFT WORKING-PLATFORM CONTROL DESK WITH PROTECTION AGAINST CRUSHING OF THE OPERATOR

(71) Applicant: HAULOTTE GROUP, L'Horme (FR)

(72) Inventors: Daniel Maisonnette, Genilac (FR); Nicolas Bonnefoy, Saint-Chamond (FR)

(73) Assignee: HAULOTTE GROUP, L'Horme (FR)

( * ) Notice: Subject to any disclaimer, the term of this patent is extended or adjusted under 35 U.S.C. 154(b) by 445 days.

(21) Appl. No.: 16/092,827

(22) PCT Filed: Apr. 6, 2017

(86) PCT No.: PCT/FR2017/050834
§ 371 (c)(1),
(2) Date: Oct. 11, 2018

(87) PCT Pub. No.: WO2017/178737
PCT Pub. Date: Oct. 19, 2017

(65) Prior Publication Data
US 2019/0119090 A1 Apr. 25, 2019

(30) Foreign Application Priority Data
Apr. 15, 2016 (FR) ...................... 1653384

(51) Int. Cl.
*B66F 17/00* (2006.01)
*B66F 11/04* (2006.01)
(Continued)

(52) U.S. Cl.
CPC ............ *B66F 17/006* (2013.01); *B66F 11/04* (2013.01); *B66F 11/042* (2013.01);
(Continued)

(58) Field of Classification Search
CPC ........ B66F 17/00; B66F 11/04; B66F 11/042; B66F 11/044; B66F 11/046; B66F 17/006;
(Continued)

(56) References Cited

U.S. PATENT DOCUMENTS 2,815,250 A    12/1957   Thornton-Trump et al.
4,979,588 A * 12/1990   Pike ...................... B66F 17/006
                                                                           182/18
(Continued)

FOREIGN PATENT DOCUMENTS

CN        102120556 A     7/2011
CN        202030492 U    11/2011
(Continued)

*Primary Examiner* — Colleen M Chavchavadze
(74) *Attorney, Agent, or Firm* — Harness Dickey & Pierce PLC

(57) ABSTRACT

The aerial work platform includes: a platform provided with a guardrail and a mechanism for lifting this platform; a desk for controlling the movements of the aerial work platform, one or more virtual-barrier systems for determining that an individual on the platform is close to a part of the guardrail adjacent to the desk and/or is leaning towards the desk, by detecting interference between the individual and the virtual barrier, the system inhibiting at least certain movements of the aerial work platform if it detects interference with the barrier. The virtual-barrier system includes at least one emitter and one receiver of waves, the system detecting interference of an external object with the barrier by the fact that the receiver receives waves emitted by the emitter by reflection off the object that is interfering with the barrier.

18 Claims, 4 Drawing Sheets

(51) Int. Cl.
  *G01S 17/93* (2020.01)
  *G01V 8/20* (2006.01)
(52) U.S. Cl.
  CPC .......... *B66F 11/044* (2013.01); *B66F 11/046* (2013.01); *G01S 17/93* (2013.01); *G01V 8/20* (2013.01)
(58) Field of Classification Search
  CPC .. F16P 3/14; F16P 3/144; G01S 17/93; G01V 8/20
  See application file for complete search history.

(56) References Cited

U.S. PATENT DOCUMENTS

| | | | | |
|---|---|---|---|---|
| 8,448,959 | B1* | 5/2013 | Pohot | B66F 13/00 |
| | | | | 280/47.131 |
| 8,490,746 | B2 | 7/2013 | Cummings | |
| 8,651,236 | B2 | 2/2014 | Bowden | |
| 8,813,910 | B2 | 8/2014 | Bowden | |
| 9,238,573 | B2 | 1/2016 | Luminet et al. | |
| 9,656,845 | B2 | 5/2017 | Dittus et al. | |
| 9,679,461 | B2* | 6/2017 | Cummings | B66F 17/006 |
| 9,988,186 | B1* | 6/2018 | Johnson | B65D 25/22 |
| 10,071,678 | B2 | 9/2018 | Luminet et al. | |
| 10,358,331 | B2* | 7/2019 | Lombardo | B66F 11/044 |
| 2005/0187712 | A1 | 8/2005 | Callaghan et al. | |
| 2006/0021985 | A1* | 2/2006 | Jasper | B25H 3/02 |
| | | | | 220/475 |
| 2013/0153333 | A1 | 6/2013 | Richards | |
| 2013/0153335 | A1* | 6/2013 | Luminet | A42B 3/046 |
| | | | | 182/112 |
| 2014/0246270 | A1 | 9/2014 | Parot et al. | |
| 2014/0332314 | A1* | 11/2014 | Carrillo | B66F 11/04 |
| | | | | 182/19 |
| 2015/0008073 | A1* | 1/2015 | Cummings | B66F 17/006 |
| | | | | 182/148 |
| 2016/0075543 | A1* | 3/2016 | Lombardo | B66F 11/044 |
| | | | | 187/247 |
| 2016/0098910 | A1* | 4/2016 | Cummings | G08B 21/02 |
| | | | | 340/540 |
| 2016/0221812 | A1* | 8/2016 | Puszkiewicz | B66F 17/006 |
| 2017/0233232 | A1* | 8/2017 | Davis | B66F 11/042 |
| | | | | 182/69.5 |
| 2017/0341566 | A1* | 11/2017 | Luminet | B66F 11/046 |
| 2018/0057333 | A1* | 3/2018 | Gale | B66F 17/006 |
| 2018/0162708 | A1* | 6/2018 | Pithoud | B66F 11/042 |
| 2019/0177140 | A1* | 6/2019 | Gilbride | B66F 11/044 |
| 2020/0095105 | A1* | 3/2020 | Yutzy | B66F 11/042 |

FOREIGN PATENT DOCUMENTS

| | | |
|---|---|---|
| FR | 2836468 A1 | 8/2003 |
| GB | 2481709 A | 1/2012 |
| JP | S6412100 U | 1/1989 |
| JP | H0453800 U | 5/1992 |
| JP | H0465299 U | 6/1992 |
| JP | H0477600 U | 7/1992 |
| JP | H05124800 A | 5/1993 |
| JP | H0592298 U | 12/1993 |
| JP | H10007398 A | 1/1998 |
| JP | 2013010589 A | 1/2013 |
| KR | 2009/0063626 A | 6/2009 |
| KR | 20090062780 A | 6/2009 |
| KR | 200465878 Y1 | 3/2013 |

* cited by examiner

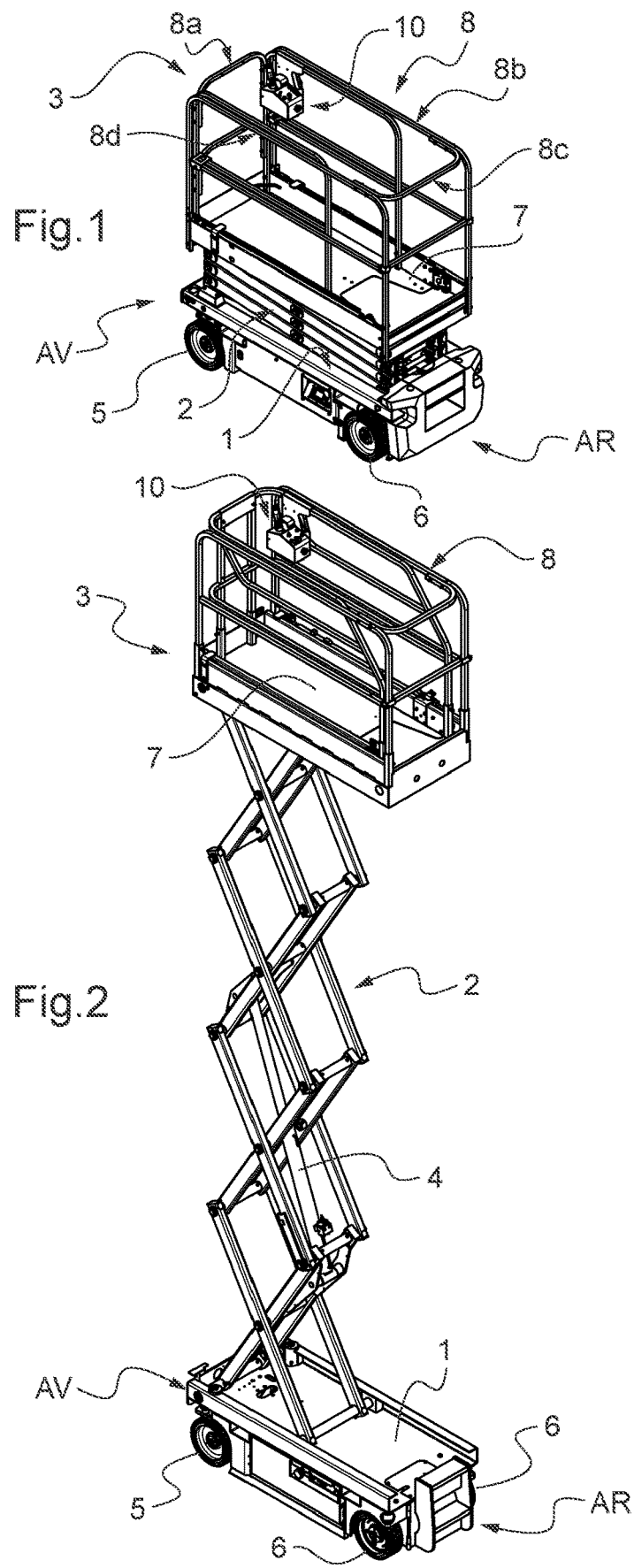

Fig.3
Fig.4
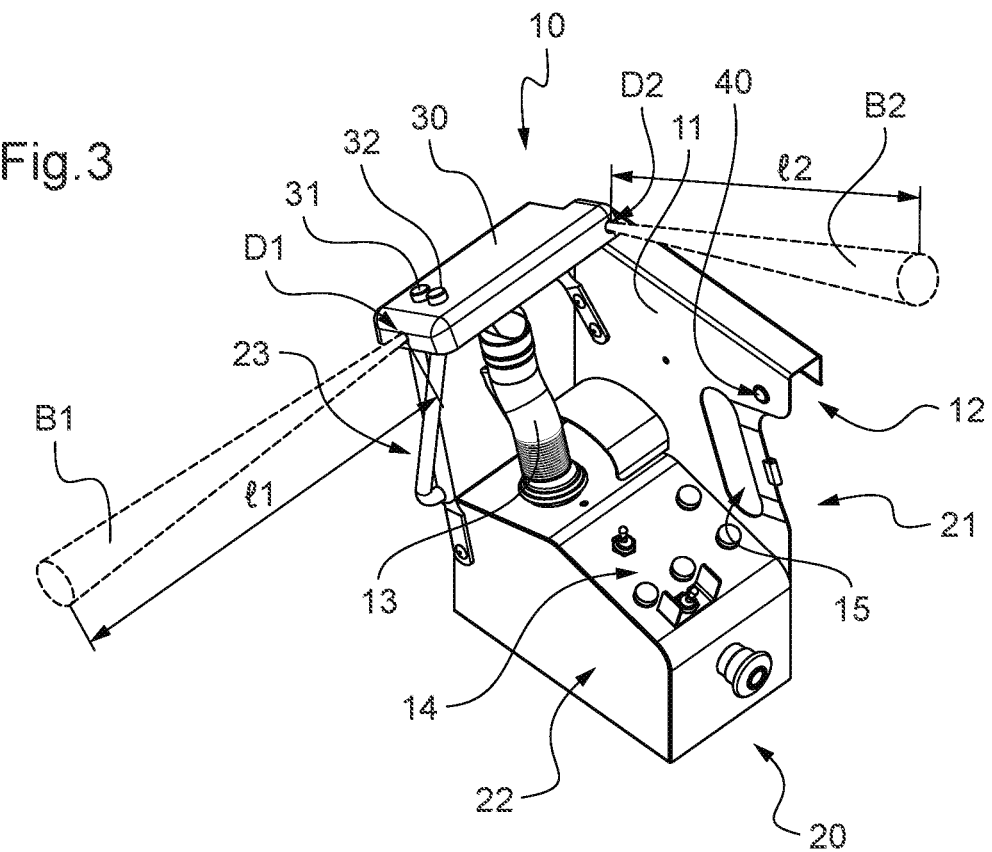
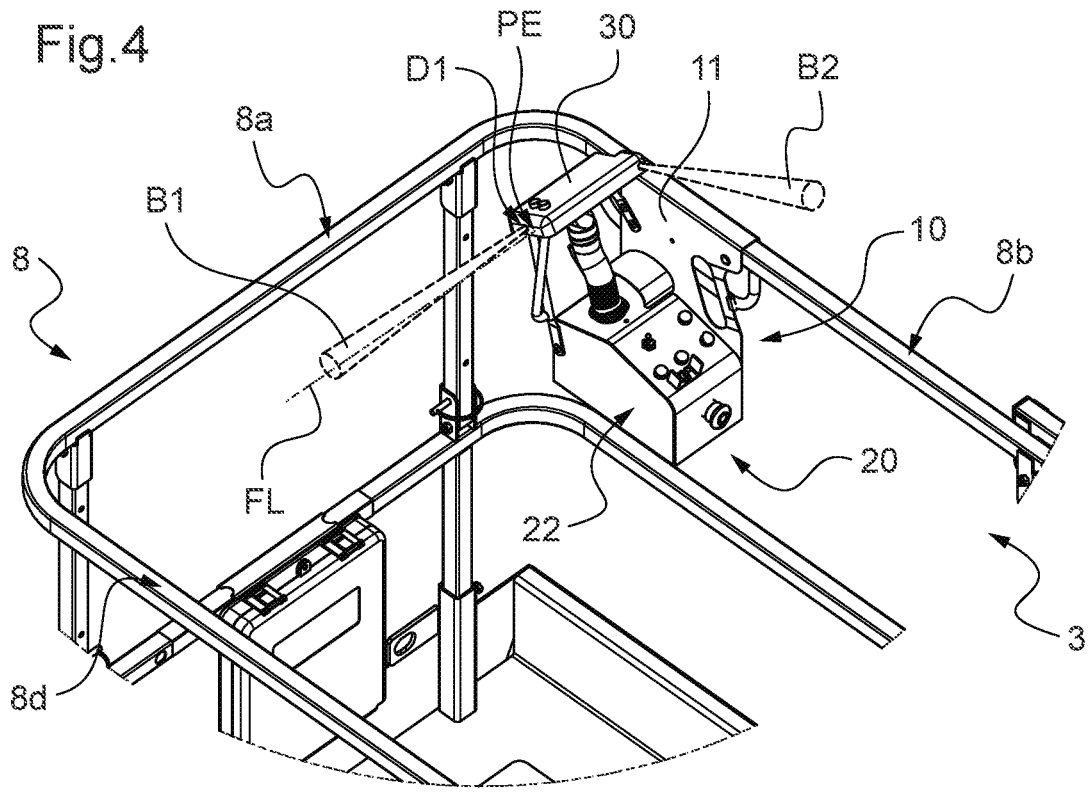

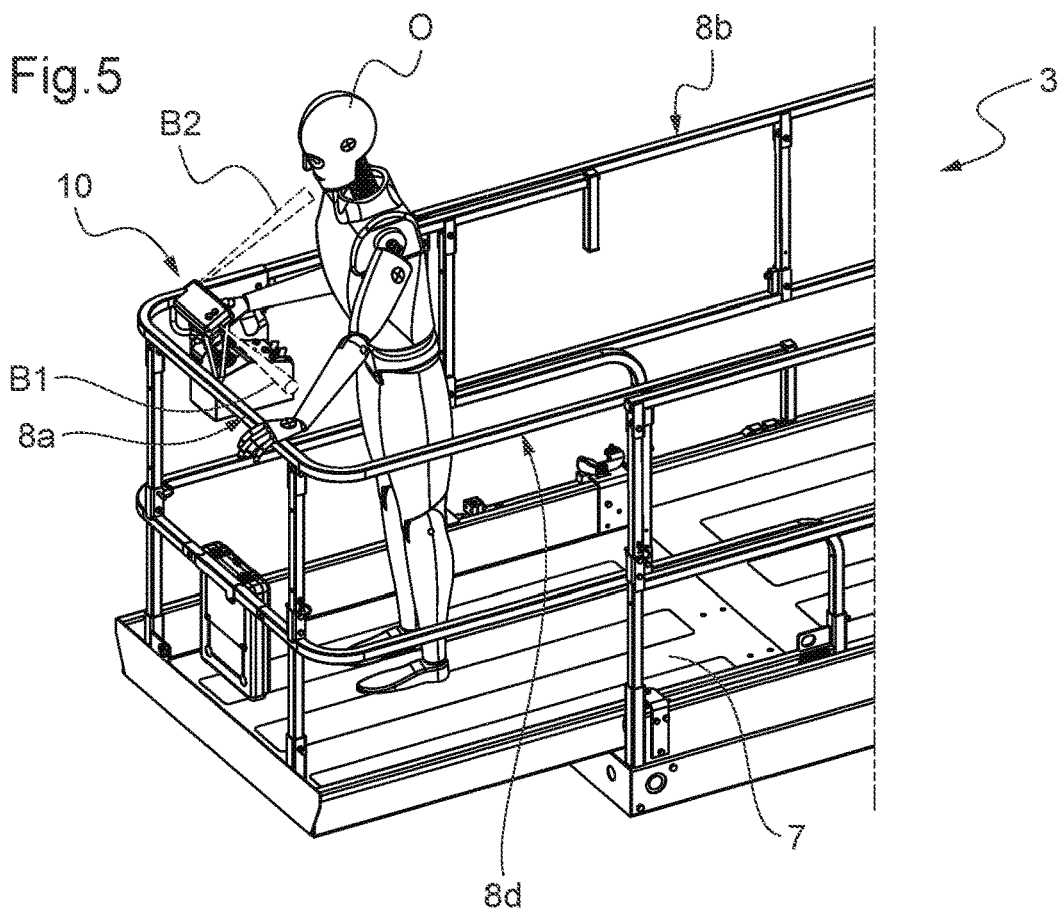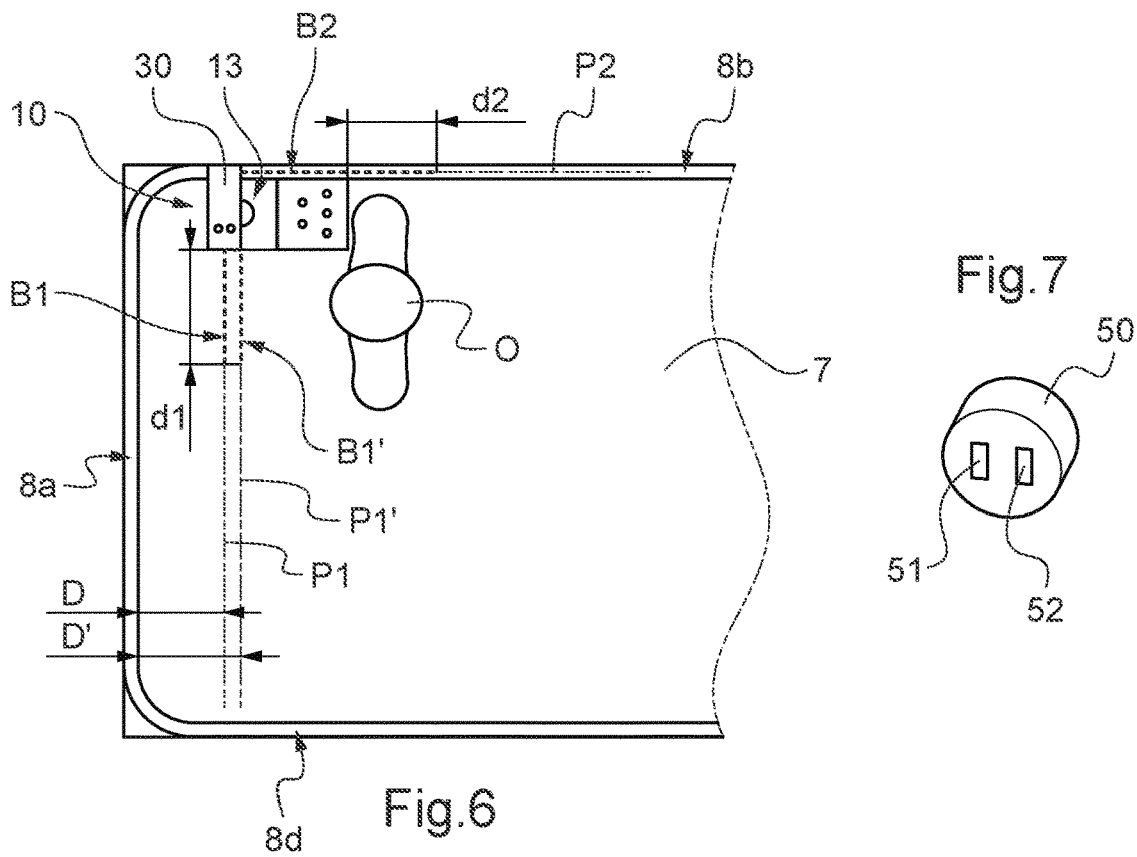

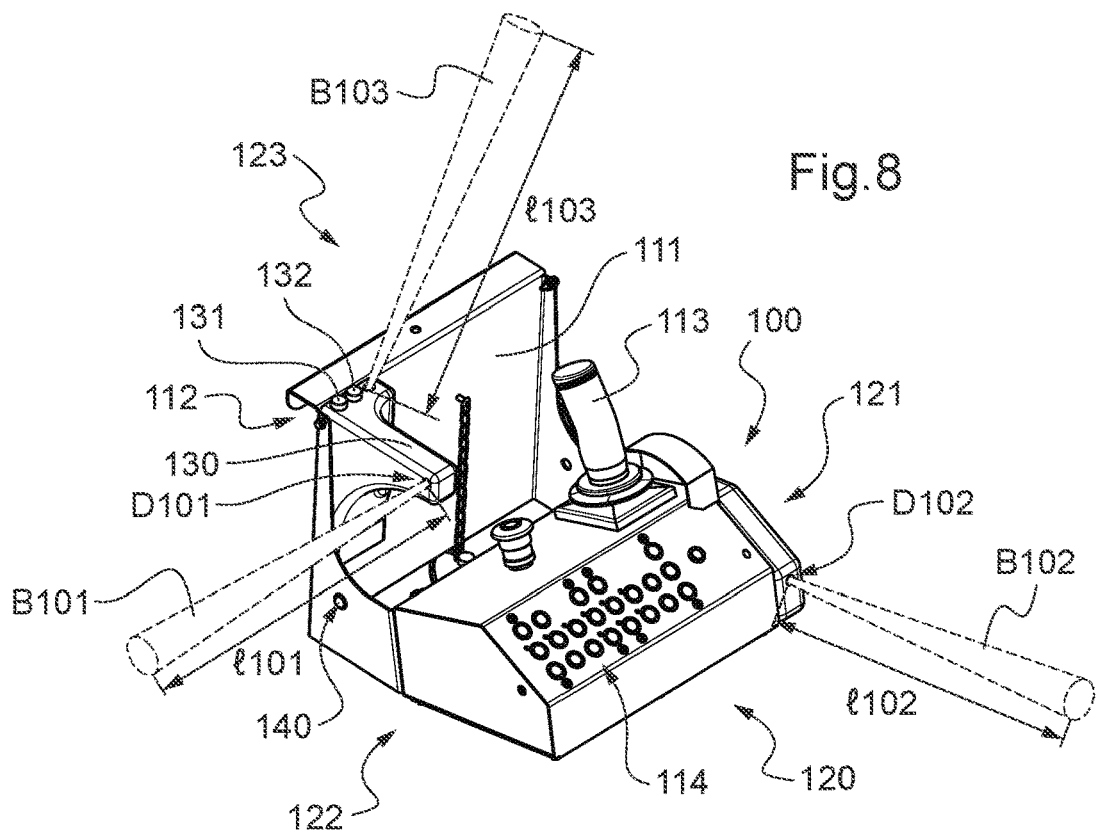
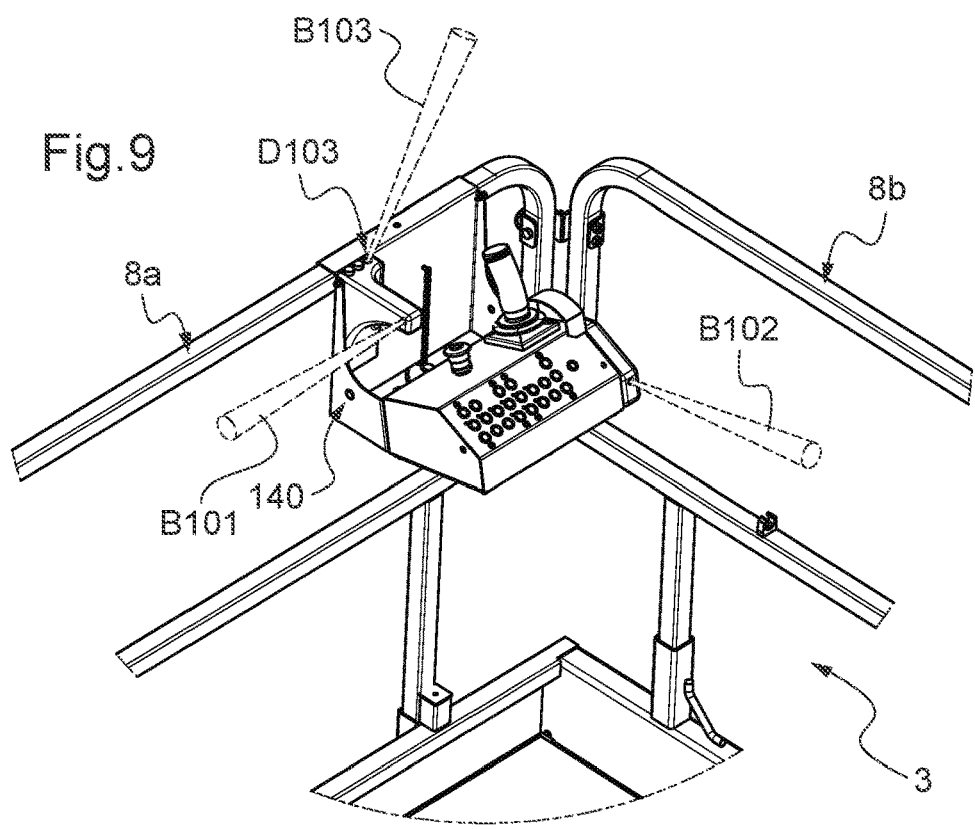

AERIAL-LIFT WORKING-PLATFORM CONTROL DESK WITH PROTECTION AGAINST CRUSHING OF THE OPERATOR

CROSS-REFERENCE TO RELATED APPLICATIONS

This application is a National Phase Entry of International Patent Application No. PCT/FR2017/050834, filed on Apr. 6, 2017 which claims priority to French Patent Application Serial No. 16/53384, filed on Apr. 15, 2016, both of which are incorporated by reference herein.

BACKGROUND AND SUMMARY

The present invention relates to the field of mobile elevating work platforms (also designed by the acronym MEWP), also commonly referred to as aerial work platforms.

Aerial work platforms are machines intended to enable one or more persons to work at a height. For this purpose, they comprise a work platform designed to receive one or more persons and optionally also loads such as tools or other equipment, materials such as paint, cement, etc. The platform comprises a deck surrounded by a guardrail. It is supported by a lifting mechanism that makes it possible to raise it from a lowered position on the chassis of the work platform to a required working position at a height.

There exist a great variety of aerial work platforms for dealing with the various uses required. Thus, various technologies of the lifting mechanism of the platform are used, according to which the aerial work platforms are generally named, for example scissor lifts, vertical-mast lifts, articulated lifts, and telescopic lifts. According to the case, the lifting device may comprise a turret mounted so as to pivot about a vertical axis on the chassis in order to make it possible to change the orientation of the lifting mechanism and therefore of the work platform with respect to the chassis. Aerial work platforms may also be automotive, that is to say motorised to allow autonomous movement thereof on the ground.

The work platform is equipped with a control desk enabling an operator on board the platform to cause the movement of the platform in order to reach the required working position. For this purpose, the desk is provided with control members enabling the operator to actuate the lifting mechanism, but also, where applicable, to allow pivoting of the turret and movement of the aerial work platform on the ground. The desk is generally mounted fixed to the guardrail or at the level of the latter and is designed so that the operator stands in front of it when he wishes to manipulate the control members.

In the case in particular of scissor lifts and vertical mast lifts, the desk is sometimes designed to be able to be moved by the operator so as to be able to attach it removably at various points on the guardrail, for example on the front or rear of the platform. For this purpose, the desk is generally more compact and lightweight than in the case of fixed desks. The desk may furthermore be designed so that the operator can hold it with one hand and manipulate its control members with the other, which makes it possible in particular to control the aerial work platform from the ground instead of from the platform. In this case, the desk is even more compact and of even more limited weight.

Moreover, the guardrail of some scissor lifts is foldable and can be folded onto the deck of the work platform in order to reduce the total height of the aerial work platform when it is not used for lifting persons. This ability facilitates the transportation of the aerial work platform and can make it possible to take it into a building through a door of normal height, which would otherwise be insufficient.

During the movement of the platform caused by an operator at the platform control desk, there is a risk that the operator may be crushed against the desk by an external obstacle—for example a part of a building, a structure or a tree branch—striking him from behind or from above. The same risk may exist with respect to the guardrail in the case where the operator may stand alongside the desk while manipulating the control members thereof. This is the case also with some movable desks that are designed so that the operator stands alongside the desk rather than in front of it when the desk is attached to the guardrail.

Various solutions have been proposed to protect the operator against this risk. Mounting the control desk permanently on the platform is thus known, but being movable counter to springs cooperating with an end-of-travel sensor, which makes it possible to detect any crushing of the operator against the desk because of its movement. This type of solution is illustrated in particular by JP H4-53800 U and WO 2011/015815 A1.

One drawback of this type of solution relates to the fact that the operator may in normal times exert high forces on the desk, for example by holding onto the control members in order to avoid being unbalanced by the movements of the platform. To avoid unwanted triggering of the crushing-detection system, the return springs must have high stiffness. Consequently crushing is detected only if the force of crushing the operator against the desk is very high, who thereby risks being injured. Moreover, it does not provide protection of the operator vis-à-vis the risk of crushing against the guardrail when he is standing alongside the desk instead in front of it. Finally, this type of solution is designed for fixed desks: it is completely unsuitable for desks that can be moved by the operator.

Similarly, JP H4-65299 U teaches mounting the control desk fixedly on a section of the guardrail that is mounted so as to rock counter to springs, a sensor detecting the rocking of the guardrail section when the operator is pushed against the desk by an obstacle. This solution makes it possible to protect the operator against the risk of crushing both against the desk and against the adjacent parts of the guardrail. However, it has all the other drawbacks of the previous solution. Furthermore, the device for protection against crushing is liable to be triggered in an unwanted fashion in the case where heavy equipment is placed against this guardrail section. Finally, this solution is difficult to implement when the platform has parts that are extensible at the ends of its deck in order to vary the length thereof.

Another solution consists of detecting the impacts of the platform against obstacles above it by means of vertical rods placed on corners of the guardrail, said rods cooperating with a sensor in order to stop the movements of the platform in the event of the rods being pressed in. This approach is illustrated by U.S. Pat. Nos. 2,815,250, 4,979,588 and KR 2004/65878U. In a similar fashion, JP 10007398 teaches fixing a U-shaped frame upside-down by means of springs on the top of a section of the guardrail, a sensor stopping the movements of the platform when an external obstacle strikes this frame. The drawback of these solutions is procuring protection against crushing from above, rather than from the side. In addition, protection against crushing from above is not reliable in the case where the aerial work platform is used under roofs or structures where beams intersect. Moreover, the rods or the projecting frame interfere with the handling of the equipment on board the platform and are exposed to impacts during such handling. Finally, it is difficult to adapt such rods or such a frame to a foldable guardrail that can be folded onto the deck of the work platform.

KR 2009/0063626 A teaches arranging a double frame on the top of the guardrail used to detect collision with an external object. The first frame is fixed to the top of the guardrail and the second frame extends at a distance above the guardrail while running along it, the second frame being fixed via springs to the first frame and the device including an end-of-travel sensor. This solution is very bulky and interferes with handling of the equipment on board the platform, and the protection device is liable to trigger in an unwanted fashion if equipment is placed on or against the guardrail, and therefore against this double frame.

JP H5-92298 U teaches mounting the top part of the guardrail in vertical translation on the bottom part of a guardrail counter to springs. On detection of the pressing-in of the top part counter to the springs, the device stops the movement of the platform. This solution has the same drawbacks as the previous solution.

KR 2009/0062780 A teaches arranging uprights on the top corners of the guardrail in order to support, at their top ends, laser emitters and laser receivers so as to create an optical barrier above each section of the guardrail. When a receiver does not receive the laser beam from the corresponding emitter, the device stops the movement of the aerial work platform.

This solution has the drawback that the uprights interfere with the freedom of movement of the operator and are exposed to impacts when equipment on board the platform is handled. In addition, the device for protection against crushing is liable to trigger in an unwanted fashion when large items of equipment such as battens or props are placed against or on the guardrail. Moreover, this solution requires precise mutual positioning of the distant emitters and receivers which is difficult to maintain during use of the aerial work platform because of the variable deformation of the deck of the work platform depending on the load placed on the deck and its location thereon. In addition, this requirement for precise mutual positioning of the emitters and receivers makes this solution incompatible with work platforms having one or two parts extensible at the ends of their deck in order to vary the length because of the relative clearances allowing sliding between these extensible parts and the deck.

Mounting a fixed or movable safety bar in front of the desk that is interposed between the desk and the operator standing in front of the desk in order to manipulate its control members is also known. The control system of the aerial work platform inhibits the movements of the aerial work platform when the bar is urged mechanically towards the desk. This type of solution is illustrated in particular by FR 3 007 401 A1, EP 2 190 775 A1, JP 64-12100, JP H4-77600 U and GB 2 481 709 A1.

This type of solution also has drawbacks. The safety bar may interfere with the freedom of movement of the operator and is generally exposed to impacts when the persons on board the platform handle equipment, in particular if it is large, such as battens or props. It also does not provide protection for the operator vis-à-vis the risk of crushing against the guardrail when he is standing alongside the desk instead in front of it. Finally, this type of solution is designed for fixed desks and is difficult to apply to, or even completely unsuitable for, desks that can be moved by the operator because of their compactness and their removable mounting on the guardrail, which does not provide a sufficiently firm holding on the guardrail.

JP 5-124800 A teaches disposing optical barriers in front of and above the desk. For this purpose, an arm is fixed to the guardrail on each side of the desk. A first arm supports a light emitter at a top end and another at a bottom end, each emitting a light beam parallel to the desk in the direction of the second arm, which correspondingly supports a respective light receiver. In normal operation, the operator does not interfere with the light beams and the receivers each receive the light beam from the corresponding emitter. If the operator is pushed towards the desk by an external obstacle, his body cuts one or other or both of the light beams, in which case the corresponding receiver or receivers no longer receive the light of the corresponding beam and consequently the device stops the movement of the aerial work platform.

This solution has drawbacks similar to those of the detection bars because of the arms supporting the emitters and receivers. This is because these arms interfere with the freedom of movement of the operator and are exposed to impacts when equipment is being manipulated on board the platform. It also does not provide protection of the operator vis-à-vis the risk of crushing against the guardrail when he is standing alongside the desk instead of in front of it. In addition, manipulating the control members of the desk from the standing position alongside the desk is difficult because of the arms and the risk of accidental interference with the top light beam, whereas this possibility may be desirable. Moreover, this solution is unsuited to the case where provision is made for the operator to stand alongside the desk rather than in front of it in order to manipulate the control members. It is also not suited to the case where the desk is attached removably to the guardrail in order to be able to be moved by the operator. In the latter case, it could be envisaged mounting the arms supporting the emitters and receivers directly on the sides of the desk, but the aforementioned drawbacks remain because of the projection of the arms towards the front and above the desk. These drawbacks would also be increased in the case of a small desk designed both to be attached removably to the guardrail and to be held with one hand while its control members are manipulated with the other hand.

The aforementioned document JP 5-124800 A also teaches arranging a pressure-sensitive mat on the deck of the platform in order to detect the presence of an operator on board and to arrange, side by side, an ultrasound emitter and an ultrasound receiver on the front vertical wall of the desk in order to detect the presence of the operator in front of it. More particularly, the presence of the operator in front of the desk is detected by the fact that the ultrasound receiver receives ultrasound emitted by the ultrasound emitter because of its reflection on the operator, which is not the case when the operator is not standing in front of the desk. The presence detection made by the pressure-sensitive belt, as well as by the ultrasound emitter receiver, does not constitute protection of the operator against crushing, but has the purpose of supplying a validation signal in order to allow movements triggered with the control levers of the desk only when the presence of the operator is detected.

EP 2 096 078 A1 teaches having recourse to a cord fixed to two opposite sections of the guardrail so as to be disposed parallel to the section of guardrail between the other two and passing either between the control desk fixed to this section of the guardrail and the operator standing in front of it, or passing above the desk towards the rear thereof by means of angle-return pulleys. The cord actuates a switch in the case of a thrust on the cord in order to stop the movements of the platform.

This solution makes it possible to protect the operator against the risk of crushing both against the desk and against the adjacent parts of the guardrail. However, it has several drawbacks. The cord is liable to be pulled away and damaged when equipment is manipulated on board the platform, in particular if it is large. Further, it interferes with the use of the platform where it is normal for persons on board to place large equipment, such as battens or props, against the guardrail. Finally, this solution is completely unsuited to the case of movable desks.

According to yet another solution, GB 2 495 158 A teaches equipping the platform with proximity sensors on the top of the guardrail in order to detect the proximity of obstacles external to the platform, for example at distances of 5 m, 3 m or 2 m. This solution is however unusable for work in an environment at a height that is very encumbered, such as under roofs or structures where beams intersect. In addition, the sensors may be damaged when equipment is handled on board the platform or the device may be triggered in an unwanted fashion when equipment—such as battens or props—is placed against or on the guardrail.

According to a more sophisticated solution than the previous one, US 2016/0075543 A1 teaches having recourse to a stereoscopic camera for determining the position of the operator on the platform in order to prevent movements of the platform or to detect external obstacles around the platform and to adapt the speed according to the distance and the form of the obstacle. This solution has the drawback of requiring electronics for real-time processing of the signals from the camera, which is complex and also cannot be used for work in a very encumbered environment at a height. The risk of unwanted triggering of the security device is also possible when equipment is placed against or on the guardrail.

The aim of the present invention is to provide a technical solution for protecting the operator on board the platform of aerial work platforms at least partially overcoming the aforementioned drawbacks. More particularly, according to one aspect of the invention, it aims to provide a simple and reliable solution that can be implemented to effectively protect the operator from crushing both against the desk and against the adjacent parts of the guardrail, which can be used also for desks that can be moved by the operator, which does not interfere with the operator, or as little as possible, and allows him latitude of positioning at the desk during use, which is not or is only a little exposed to the risk of damage or breaking during handling of equipment on board the platform, which leaves the possibility of placing equipment against or on the guardrail and which can also be used in working zones at a height that are encumbered for example by beams.

To this end, the present invention proposes an aerial work platform comprising a work platform provided with a guardrail, a mechanism for lifting the work platform and a control desk on which manual control members are arranged for controlling movement of the aerial work platform, as well as at least one non-physical barrier system. The desk may be mounted permanently on the platform either on the guardrail or adjacent to the guardrail. The desk is preferably situated towards the inside of the platform, but can also be situated at the outside. The desk may also be designed to be attached removably to the guardrail at various points on the guardrail, preferably towards the inside of the platform, the desk then being designed to be attached to and detached from the guardrail manually without a tool.

The non-physical barrier system is designed to determine—when the desk is attached to the guardrail if it is a removable desk—that a person on the platform is in the vicinity of a part of the guardrail adjacent to the desk and/or is leaning towards the desk by detecting an interference of the person with the non-physical barrier, the system inhibiting at least some movements of the aerial work platform in the event of detection of interference with the barrier. For this purpose, the non-physical barrier system comprises at least one wave emitter and a wave receiver for conjointly creating the non-physical barrier so that the system detects interference of an external object with the barrier because the receiver receives waves emitted by the emitter by reflection on the object interfering with the barrier. The emitter(s) and receiver(s) of the non-physical barrier system are positioned suitably so that the non-physical barrier extends at the level of the desk and/or a part of the guardrail adjacent to the desk depending on whether it is a case of protecting the operator from crushing against the desk and/or against this part of the guardrail.

In the case of a removable desk, the emitter(s) and receiver(s) of the non-physical barrier are arranged on the desk. In this way, the non-physical barrier is always positioned in the same way with respect to the desk, whatever the place on the guardrail where the operator attaches the desk. With regard to the protection of the operator from crushing against the desk, it will therefore be effective whatever the place on the guardrail where the desk is attached. This will also be the case with regard to the protection of the operator from crushing against a part of the guardrail adjacent to the desk because the system for attaching the desk to the guardrail procures a substantially identical relative positioning between the desk and at least the section of the guardrail to which it is attached.

In the case of a desk mounted permanently on the platform, the emitter(s) and receiver(s) of the non-physical barrier are preferably also mounted on the desk, but may also be mounted elsewhere, for example on the guardrail. Whether the desk be removable or mounted permanently, it is preferable for the emitter(s) and receiver(s) of the non-physical barrier to be mounted at a fixed point on the desk for reasons of simplicity. However, they may also be mounted on a movable part such as a protective cover of the desk movable between a closed and open position, provided that their position in use provides suitable placing of the non-physical barriers with respect to the guardrail and/or the desk according to the case.

The detection principle of the non-physical barrier system used is different from those used for aerial work platforms of the prior art. For example, in JP 5-124800 A, the emitter and receiver are facing one another at a distance from one another and defining between them the non-physical barrier, the receiver receiving the light beam from the receiver in the absence of interference of an external object therewith and the detection of an interference with the non-physical barrier resulting from the fact that the receiver no longer receives the light beam emitted by the emitter because of the external object that is interposed between them.

The detection principle of the non-physical barrier system according to this first aspect of the invention is the opposite of that of the prior art. In other words, in the absence of interference of an external object with the non-physical barrier, the receiver does not receive any waves emitted by the emitter or at least in insufficient quantity—for example by reflection on external objects beyond the non-physical barrier—that the non-physical barrier system does not detect as being interference of an external object with the non-physical barrier. On the other hand, when an external object interferes with the non-physical barrier, it reflects the waves emitted by the emitter and at least part of these waves is received by the receiver, which is then detected by the non-physical barrier system as corresponding to interference of an external object with the non-physical barrier.

Using one or more non-physical barriers functioning according to this detection principle is particularly advantageous. This is because the emitters and receivers do not need to be mounted facing one another and at a distance from one another in order to define the non-physical barrier between them. On the contrary, the emitter(s) and receiver(s) can be situated on the same side with respect to the non-physical barrier, which allows compact mounting of the emitter(s) and receiver(s) on the desk (or elsewhere) and at a place thereon where it does not interfere with the user. It is thus possible to avoid having recourse to significantly projecting arms on the sides of the desk for supporting the emitters and receivers as in JP 5-124800 A. Because of this, not only is the operator not interfered with, but the emitter(s) and their support are not exposed to an impact during handling of equipment on board the platform.

This type of non-physical barrier system is known per se. It can be implemented in a simple and economical fashion since it can function on a two-state principle without requiring a complex signal processing system as is the case in US 2016/0075543 A1.

Moreover, the sizing of the non-physical barrier or barriers involved in the non-physical barrier system or systems can advantageously be chosen so as to extend only a limited distance alongside or above the desk. In particular, the sizing thereof can be limited so as to protect the operator from crushing against the desk and/or guardrail only when he is in a position in front of and/or alongside the desk from which he is in a position to manipulate the control members of the desk. This can be assessed for example with respect to an operator of average size of 1 m73. This can avoid a further-away part of the guardrail possibly interfering with the non-physical barrier. In addition, this avoids other persons on board the platform interfering with the non-physical barrier or barriers if they approach or hold onto a part of the guardrail distant from the desk. Similarly, it is possible to place bulky equipment—such as battens, props, pipes, etc.— against or on the rest of the guardrail without interfering with the non-physical barrier or barriers. In this way an unwanted triggering of the non-physical barrier system is avoided. The same applies with respect to obstacles external to the platform, in particular in the case of work at a height in areas encumbered for example by beams under roofs or structures.

Naturally, in the case where the non-physical barrier system has a minimum detection distance below which it does not detect an object interfering with the waves emitted by the emitter, a person skilled in the art would design a system and will dispose the emitter(s) and receiver(s) appropriately in order to reliably detect the fact that the operator is too close to the desk and/or to the adjacent part of the guardrail according to circumstances. From this point of view, it is preferable for the minimum detection distance of the system measured from the desk to be less than or equal to 5 cm.

According to preferred embodiments of the invention according to this aspect, the invention comprises one or more of the following features:

the non-physical barrier system is designed to determine that the person on the platform is in proximity to a part of the guardrail that is laterally adjacent to the desk; the emitter emits a beam of waves in a given direction;

the emitter emits in the electromagnetic wave range comprising ultraviolet, visible light and infrared;

the emitter and receiver form a photoelectric detector;

the non-physical barrier system comprises a single wave emitter and a single wave receiver;

the emitter and receiver are arranged side by side and are preferably integrated in the same housing in order to form a single component;

the desk comprises visual and/or audible signaling in the case of detection of interference with the non-physical barrier;

the desk comprises a manual-actuation member, the actuation of which prevents the non-physical barrier system from inhibiting the movements of the aerial work platform;

the non-physical barrier system also comprises a photoemitter for emitting a light beam visible to the naked eye that runs along the non-physical barrier;

the desk comprises a complementary non-physical barrier system for detecting that a person on the platform is in the vicinity of said part of the guardrail adjacent to the desk and/or is leaning towards the desk by detecting interference of the person with the complementary non-physical barrier, the complementary non-physical barrier being disposed so that the complementary non-physical barrier system effects detection for proximity of the person with said part of the guardrail and/or for a leaning of the person towards the desk that is less than for the non-physical barrier system, the complementary non-physical barrier system triggering a signaling device;

the non-physical barrier extends—when the desk is attached to the guardrail if it is a case of a removable desk—either in front of the guardrail part adjacent laterally to the desk on the side towards the inside of the platform, or above the part of the guardrail adjacent laterally to the desk, the non-physical barrier being in a substantially vertical plane parallel to this part of the guardrail;

the horizontal extension distance of the non-physical barrier away from the desk:
  is limited so that the non-physical barrier does not— when the desk is attached to the guardrail if it is a case of a removable barrier—extend as far as the level of the section of the guardrail in the extension of the non-physical barrier; and/or
  is less than or equal to 100 cm, more preferentially less than or equal to 60 cm;

the non-physical barrier extends:
  a) either in a zone adjacent to a lateral side of the desk, the non-physical barrier being in a substantially vertical plane parallel to the rear side of the desk;
  b) or in a zone in front of the desk, the non-physical barrier being in a substantially vertical plane perpendicular to the rear side of the desk and located towards a lateral side of the desk;
  c) or above the desk from the rear thereof to detect that a person is leaning over the desk;

the maximum detection distance of the non-physical barrier measured from the desk is less than or equal to 100 cm and more preferentially less than or equal to 60 cm;

the aerial work platform comprises two or three non-physical barrier systems, in which:

the aerial work platform is in accordance with alternative a) mentioned above when considering the first non-physical barrier system, the aerial work platform is in accordance with alternative b) mentioned above when considering the second non-physical barrier system, and the aerial work platform being in accordance with alternative c) mentioned above when considering where applicable the third non-physical barrier system;

the aerial work platform is a scissor lift or a vertical-mast.

Other aspects, features and advantages of the invention will emerge from a reading of the following description of a preferred embodiment of the invention, given by way of example and with reference to the accompanying drawing.

BRIEF DESCRIPTION OF THE DRAWINGS

FIGS. 1 and 2 illustrate a scissor aerial work platform according to a first preferred embodiment, the platform being respectively in the position lowered on its carriage and in the raised position.

FIG. 3 shows an isolated view of the control desk of the aerial work platform of FIGS. 1 and 2 that is provided with two non-physical barrier systems.

FIG. 4 shows a local view of the aerial work platform of FIGS. 1 and 2 that shows one end of the work platform and the control desk attached to its guardrail.

FIGS. 5 and 6 show schematically a local view—respectively in perspective and in plan view—of the aerial work platform of FIGS. 1 and 2 with an operator standing alongside the control desk.

FIG. 7 shows an enlarged view of a photoelectric detector used for implementing the non-physical barriers.

FIG. 8 shows an isolated view of another control desk provided with three non-physical barrier systems provided for an aerial work platform according to a second preferred embodiment.

FIG. 9 shows a local view of the aerial work platform of FIGS. 1 and 2 that is similar to FIG. 4, except that the control desk is that of FIG. 8.

DETAILED DESCRIPTION

We shall now describe the aerial work platform according to the first preferred embodiment with reference to FIGS. 1 to 4. As can be seen in FIGS. 1 and 2, the aerial work platform is a scissor lift. It comprises a chassis 1, a scissor lifting mechanism 2 mounted on the chassis 1 and a work platform 3 mounted on the scissor lifting mechanism 2. The platform 3 is provided with a horizontal deck 7 surrounded by a guardrail 8 to prevent persons falling from it. The guardrail 8 comprises four sections 8a, 8b, 8c, 8d each corresponding to another side of the deck 7. The deck 7 and the guardrail 8 may comprise sliding parts at one end of the platform 3 or at both in order to enable the users to vary the available working surface of the platform 8.

The scissor lifting mechanism 2 comprises beams articulated at their center like scissors, these scissor mechanisms being mounted one above the other by their ends which are connected pivotably in order to reach the required working height. A hydraulic jack 4—or in a variant a plurality—makes it possible to lower and raise the work platform 3 to the desired working height.

The chassis 1 is provided with front wheels 5 and rear wheels 6 by means of which the chassis 1 rests on the ground and making it possible to move the aerial work platform. The front side of the aerial work platform is referenced AV and its rear side is referenced AR. The aerial work platform has a drive to enable it to be moved autonomously on the ground. The drive is generally mounted on the chassis 1.

In a variant, the invention also relates to vertical-mast aerial work platforms. With regard to vertical-mast lifts, the lifting mechanism is designed in the form of an extensible mast comprising vertical parts sliding one on the other in order to extend vertically as far as the desired working height. The lifting mechanism thereof sometimes comprises a turret on which the sliding vertical parts are mounted, the turret being mounted so as to be able to pivot on the chassis about a vertical axis in order to be able to vary the orientation of the work platform with respect to the chassis. The work platform is mounted on the highest vertical part sometimes by means of a pendular arm—that is to say an arm articulated on the vertical mast about a horizontal axis—in order to give more flexibility to the user in reaching the working position.

More generally, the invention relates to any other type of aerial work platform, whatever the type of platform lifting mechanism, in particular telescopic or articulated aerial work platforms. The invention is also applicable to the case of aerial work platforms that are not motorized in order to provide autonomous movement thereof on the ground, but which are pulled or pushed for this purpose.

The platform 3 is equipped with a control desk 10. The desk 10 is provided with control members enabling an operator to cause the movement of the platform in order to reach the desired working position. In this example, buttons 14 make it possible to select the type of movement achievable by a control handle 13 allowing the movement of the aerial work platform on the ground and the vertical movement of the platform 3. The control handle 13 makes it possible to execute the type of movement selected: it can be inclined forwards or backwards in order, according to circumstances, to raise or lower the platform 3 or to move the aerial work platform forwards or backwards on the ground, as well as to vary its speed of movement. Buttons—not shown—situated on the top of the control handle 13 make it possible to modify the orientation of the steered wheels, in this case the front wheels 5—in a variant, the rear wheels 6. The desk 10 is provided with a cabled connection, not shown—or in a variant a wireless connection—with a control system—not visible—housed under the chassis 1, said control system controlling the power devices, in particular the drive and the hydraulic jack or jacks 4.

The desk 10 is removable and designed to be attached at various points on the guardrail 8 for convenience of maneuvers of the aerial work platform by the operator on board the platform 3. For this purpose, the desk 10 has on its right side 21 a lateral plate 11 in vertical extension with respect to the desk housing. The plate 11 has at its top end a suitable form 12—for example a cross section in an inverted U—making it possible to attach the desk 10 to a horizontal bar with a corresponding dimension of the guardrail 8. The attachment system may be different and implemented in any suitable manner that enables the operator to manually detach or attach the desk from or to the guardrail without requiring a tool. A system for manual locking of the desk 10 on the guardrail 8 may also be provided, or a system for locating the desk 10 on the guardrail 8 by means for example of a pin in order to prevent the desk 10 sliding on the guardrail 8 under the effect of vibrations for example.

The desk 10 is also designed to be able to be held by only one hand so that the operator can manipulate the control members 13, 14 with the other. This enables the operator to control the aerial work platform from the ground. For this purpose, the desk 10 is provided with a gripping handle 15 produced in this example in the form of an opening provided in the lateral plate 11. In addition, the desk 10 is sufficiently compact—preferably with a width of less than 30 cm, or even less than 25 cm—and with a suitable low weight.

When he is on board the platform 3, the operator manipulates the control members 13, 14 of the desk 10 when it is attached to the guardrail. It is then attached so as to be on the side of the guardrail 8 towards the inside of the platform 3 in order to have access conveniently to the control members 13, 14. Usually, the operator attaches the desk 10 towards the front end of the long section 8b of the guardrail—as illustrated in FIGS. 1, 2 and 4—or towards the rear end of the long section 8d of the guardrail 8. This enables the operator to position himself at the front or rear of the platform in order to make maneuverers of forward or backward movement of the aerial work platform on the ground.

Because of the short width of the desk 10 and because its system for attachment to the guardrail 8 is arranged on the right side 21, the operator normally stands on the left side 22 of the desk 10 when he is manipulating the control members 13, 14, in this case with his right hand. This position is illustrated by FIG. 5, where the operator is referenced by the letter O, and also in FIG. 6, where he is depicted symbolically. The risk of crushing of the operator then stems above all from an obstacle striking him from the rear when moving the aerial work platform backwards or striking him from above when raising the platform 3.

Nevertheless, the operator is also liable to approach the section 8b of the guardrail 8 and to lean to his right side over this section, for example in order to look at the orientation of the wheels. Similarly, the operator is liable to position himself in front of the front side 20 of the desk 10, facing the section 8b of the guardrail 8, while manipulating the control members 13, 14 with his left hand and leaning over the section 8b of the guardrail 8. The risk of crushing against this section 8b then stems especially from an external obstacle above him if he is executing a command for raising the platform.

In order to ensure the safety of the operator, the desk 10 is provided with two non-physical barrier systems. The first system erects a non-physical barrier B1 in front of the part of the section 8a of the guardrail 8 that is adjacent to the left side 22 of the desk 10. The second system erects a non-physical barrier B2 in front of the part of the section 8b of the guardrail 8 that is adjacent to the right side 121 of the desk 10 and which projects laterally from the desk 10 beyond its front side 20.

When the operator interferes with either of the non-physical barriers B1, B2, their system inhibits at least some movements of the aerial work platform since such a situation corresponds potentially to a situation of risk of crushing of the operator against the section 8a or 8b of the guardrail 8. Preferably, the non-physical barrier systems inhibit only movements presenting a danger of crushing of the operator by obstacles external to the aerial work platform. Thus, in this example, the inhibition may be limited to the forward and backward movements of the aerial work platform on the ground, and to the movement of raising the platform 3 with respect to the chassis 1. It is advantageous to allow the change of orientation of the wheels despite an interference of the operator with one or other non-physical barrier B1, B2 in order to enable the operator to lean over the guardrail 8 in order to see the orientation of the steered wheels 5 or 6. It will be understood that the two non-physical barrier systems may share a common electronic processing circuit, which may be accommodated in the desk 10.

In the case of inhibition of the movements of the aerial work platform caused by the non-physical barrier systems, it is advantageous to give the possibility to the operator of ending the inhibition of the movements, which enables him to overcome the situation where the inhibition was caused by an unintentional interference with one of the non-physical barriers in the absence of any risk of crushing of the operator. This possibility may consist of the actuation of the pushbutton 40—or another manual-actuation member— which also fulfills another function discussed below.

The non-physical barriers B1 and B2 each extend preferentially in a vertical plane P1, P2 parallel to the corresponding guardrail section 8a, 8b: cf. FIG. 6, where the planes P1, P2 are shown in dot-and-dash lines while the non-physical barriers B1, B2 are shown symbolically in dotted lines. Thus the plane P1 is also parallel to the rear side 23 of the desk 10 and the plane P2 is parallel to the right side 21 of the desk 10 and perpendicular to it rear side 23. The plane P1 extends at a non-zero distance D from the section 8a of the guardrail 8. The barrier B1 therefore makes it possible to detect the situations where the operator O approaches to a distance D or less from the section 8a of the guardrail 8 in the area close to the desk 10.

It is preferable to provide for the distance D to be always greater than a given minimum distance. In particular, it is advantageous for this given minimum distance to be greater than or equal to the braking distance of the aerial work platform when it is moving in reverse at its maximum speed while the platform 3 is in a raised position with respect to the chassis 1. In this way, the operator is prevented from being able to be crushed against the section 8a of the guardrail 8 despite the stoppage of the movement of the aerial work platform caused by the non-physical barrier system B1 in the case of interference by the operator with it because of an external obstacle striking him from the rear. Naturally it is advantageous to provide the same measure when the desk 10 is attached towards the rear of the section 8d of the guardrail 8 having regard to the maximum speed of movement of the aerial work platform in forward motion. This given minimum distance will generally be approximately 15 cm.

Advantageously, the sections 8a and 8b are connected by a rounded portion that does not make it possible to attach the desk 10 thereto, which has the effect of making it necessary to comply with the required minimum distance. It will be understood that a given minimum distance may be imposed on D in other ways. The plane P2 is in our example coincident with the plane of the section 8b of the guardrail.

As can be seen, the extension distance—denoted respectively d1 and d2—of the non-physical barriers B1, B2 in the horizontal direction away from the desk 10 is preferably limited in order to protect the operator only vis-à-vis parts of the sections 8a, 8b against which the operator is liable to be crushed when he is in the position of manipulating the control members 13, 14 of the desk 10 attached to the guardrail. From this point of view, it is first of all preferable for the extension distance d1 to be limited so that the non-physical barrier B1 does not extend as far as to the level of the section 8d, or respectively 8b, when the desk 10 is attached to the section 8b, or respectively 8d, which eliminates the risk of this section of the guardrail 8 interfering with the non-physical barrier B1. This consideration is generally valid for any non-physical barrier, whatever the embodiment. Next, in more general terms, it is advantageous for d1 and d2 to be less than or equal to 100 cm, more preferentially less than or equal to 60 cm. Because of this, it is possible to place equipment on or against the other areas of the guardrail 8 or to stand there without risking an unwanted triggering of the non-physical barrier systems. However, it is preferable for d1 and d2 to be greater than or equal to 10 cm and more preferentially greater than or equal to 20 cm.

The two non-physical barrier systems may each be implemented by means of a respective photoelectric detector D1, D2. Photoelectric detectors are known per se. As illustrated schematically in FIG. 7, a photoelectric detector generally comprises a photoemitter 51 and a photoreceiver 52 placed side by side in a housing 50 coated with resin or formed by it. The photoemitter 51 is generally a light emitting diode that emits a beam of electromagnetic waves in a given direction. The beam of the non-physical barriers B1, B2 is shown in each case in dotted lines in FIGS. 3, 4 and 6. In the context of the invention, it is preferable to choose a detector the photoemitter of which emits in the infrared range (the range of wavelengths from 780 nm to 1 mm) since this type of detector is quite insensitive to the texture and colors of garments. Recourse may also be had to detectors the photoemitter of which emits in the visible light range (i.e. the range of wavelengths from 380 nm to 780 nm) or in the ultraviolet range (i.e. the range of wavelengths from 10 nm to 380 nm). The photoelectric detector generally integrates in its housing an optical system for directing the beam emitted by the photoemitter and an electronic processing circuit for extracting and amplifying the waves from the photoemitter received by the photoreceiver and comparing the signal with a threshold in order to supply an output signal resulting from the comparison. Detectors with background suppression will preferably be chosen, that is to say which precisely fixes the maximum detection distance. By way of example, use may be made of photoelectric detectors in the E3Z range marketed by the Japanese company OMRON Corporation.

As can be seen in the figures, the photoelectric detectors D1 and D2 are mounted in a respective housing of a support 30 mounted—preferably in a fixed manner—on the desk 10. The support 30 is advantageously mounted towards the rear of the desk 10 at a level only slightly projecting from the lateral plate 11. In this way, the risk of exposure of the support 30 to impacts during the handling of equipment on board the platform 3 is limited. In addition, the support 30 is not in a position that interferes with the operator.

Use of a single photoelectric detector for producing each of the non-physical barriers B1, B2 has the advantage of being simple and economical. It will be understood that it is also possible to use a plurality of photoelectric detectors for producing each of the non-physical barriers B1, B2, each being defined then by a plurality of light beams that can for example be radiated with different angles in the same vertical plane P1, P2 or be offset mutually therein. It will also be understood that non-physical barrier technologies may be envisaged other than those based on beams of electromagnetic waves.

In order to provide information to the operator concerning the state of the non-physical barrier systems, two indicator lights 31, 32, respectively green and red, are arranged on the support 30. The light 31 is switched on and the light 32 is switched off in the absence of detection of interference with the non-physical barriers B1, B2. Conversely, the light 31 is switched off and the light 32 is switched on in the case of detection of interference with one or other or both of the non-physical barriers B1, B2. Alternatively or in addition, an audible signal on the desk 10—or elsewhere on the aerial work platform—may be triggered in the case of detection of such interference.

Moreover, provision may be made for triggering an alarm signal in order to attract the attention of persons external to the aerial work platform who are able to come to the aid of the operator on board the platform 3. This alarm signal may be a visual signal such as a flashing beacon arranged on the aerial work platform, a high-power audible signal generated by an alarm preferably fixed to the chassis 1, or a message sent by the aerial work platform to a remote server by a wireless connection. These various types of alarm signal may also be combined. It is advantageous to provide a time delay between the detection of the interference with one of the non-physical barriers on the triggering of these alarm signals, in order to enable the operator to cancel an unwanted detection.

A pushbutton 40—or other manually-actuated member—is arranged on the desk 10, which enables the operator to neutralize the non-physical barrier systems so that they cannot inhibit the movements of the aerial work platform. This enables him to prevent unwanted triggerings of the non-physical barrier systems when he is holding the desk 10 in his hand. It is preferable for the neutralization to be effective only as long the operator holds the pushbutton or the member concerned actuated. The indicator lights 31 and 32 are switched off when the pushbutton 40 is actuated, which indicates to the operator that the non-physical barriers B1, B2 are neutralized.

According to an advantageous option, each of the non-physical barrier systems B1, B2 is supplemented by a complementary non-physical barrier system, the non-physical barrier of which is interposed between the operator and the non-physical barrier B1 or B2 concerned. For convenience of depiction, such a complementary barrier is illustrated only in FIG. 6 and only for the non-physical barrier B1: it is shown thereon symbolically in dotted lines and referenced B1' and is contained in a vertical plane P1'—shown in dot-and-dash lines—that is parallel to the plane P1, but which is situated at a distance D' from the section 8a that is greater than D. Unlike the non-physical barrier systems B1 and B2, the complementary non-physical barrier system does not inhibit movements of the aerial work platform, but triggers a signaling device—for example visual and/or audible—preferably arranged on the desk 10 or optionally elsewhere on the platform 3. The function of this signaling device is to warn the operator that he is close to one of the non-physical barriers B1 or B2 and to make him aware that, if he advances further towards the relevant section of the guardrail, he will cause the inhibition of movements of the aerial work platform by interfering with it. The non-physical barrier of the complementary system is implemented by means of wave emitter(s) and receiver(s) by applying the same operating principles as those discussed for implementing the non-physical barriers B1 and B2.

According to another advantageous option, the non-physical barriers B1 and B2 may be supplemented each by a photoemitter placed alongside the wave emitter of the non-physical barrier in question and emitting a light beam visible to the naked eye that runs substantially along this non-physical barrier. For convenience of depiction, such a light beam is illustrated only in FIG. 4 and solely for the non-physical barrier B1: it is shown therein symbolically in dot-and-dash lines and referenced FL, the photoemitter being referenced PE. This light beam indicates to the operator the position of the non-physical barrier concerned, which is advantageous when the latter is invisible to the operator, for example in the case of an infrared or ultraviolet barrier.

It will be understood that these two advantageous options are applicable in general, whatever the embodiment, and in particular vis-à-vis each of the three non-physical barrier systems of the embodiment in FIGS. 8 and 9, which we shall describe now. FIGS. 8 and 9 illustrate a second preferred embodiment using another control desk—referenced 100—provided with manual control members 113, 114 similar to those of the desk 10. The elements corresponding to those of the desk 10 are referenced by the same reference number increased by 100.

The whole of the description given for the first preferred embodiment is applicable to the second preferred embodiment, except for the differences discussed below. In this case, the desk 100 is also removable and designed to be attached at different points on the guardrail 8 by the operator without using tools. However, in this case, its attachment system 111, 112 is placed on the rear side 123 of the desk 100. The desk 100 has a size and weight greater than those of the desk 10 and is not designed to be held with one hand while manipulating the control members 113, 114 with the other hand.

The desk 100 comprises two non-physical barrier systems B101, B102 that fulfill the same function and are produced in the same way as the non-physical barriers B1, B2 of the desk 10. It will be noted that the photoelectric detector D102 of the non-physical barrier B102 is housed this time laterally at the bottom part of the front side of the desk 100. The photoelectric detector D101 of the non-physical barrier B101 is housed in a support 130 that advances with respect to the rear plate 111 for mounting on the guardrail 8. This makes it possible to place the non-physical barrier B101 at the desirable minimum distance from the section 8a of the guardrail 8.

Finally, because the desk 100 is wider than the desk 10, it is desirable to protect the operator from the risk of crushing against the desk 100. For this purpose, the desk 100 comprises a third non-physical barrier system B103. It can be implemented with the same technology as the other two.

The non-physical barrier B103 extends above the desk 100, preferably from the rear 123 thereof so that the operator does not interfere with the non-physical barrier 103 when he stands upright at the desk 100, but on the other hand he interferes with it when he is leaning beyond a certain angle over the desk 100. For this purpose, it is advantageous for the non-physical barrier B103 to extend from the rear 123 of the desk 100 while being oriented upwards in the direction of the front 120 of the desk 100 as illustrated. As with the other two, the third non-physical barrier system inhibits the same movements of the aerial work platform in the event of detection of interference with the non-physical barrier 103. Moreover, it is preferable for the maximum detection distance of the third non-physical barrier system from the desk 100 also to be limited suitably so as to avoid unwanted triggerings of the third non-physical barrier system when the working environment at a height is encumbered.

In general terms, it is preferable for the maximum detection distance of any of the non-physical barriers, measured from the desk 10, 100, to be less than or equal to 100 cm and more preferentially less than or equal to 60 cm, in order to avoid unwanted triggerings of the corresponding non-physical barrier system. This maximum detection distance is referenced 11 and 12 for the non-physical barriers B1 and B2 respectively of the desk 10—cf. FIG. 3—and is referenced 1101, 1102 and 1103 for the non-physical barriers B101, B102 and B103 respectively of the desk 100.

Naturally, the present invention is not limited to the examples and embodiment described and depicted, but is capable of numerous variants accessible to a person skilled in the art. In particular, the non-physical barrier systems described may also be implemented on a control desk that is not designed to be removable and movable manually by the operator, but which on the other hand is mounted permanently at a given place on the guardrail—or adjacent thereto—of the platform of the aerial work platform. If the desk is fixed at the middle of a section of the fencing, the two non-physical barriers extending on either side of the desk will both be in a vertical plane substantially parallel to this section of the guardrail.

Moreover, the non-physical barrier systems may also be combined with other systems for protecting the operator against crushing. For example, the control desk can be provided with a safety bar protecting the operator from crushing against the desk while a respective non-physical barrier on either side of the desk protects him from crushing against the parts of the guardrail adjacent to the desk. Naturally, it is possible also to arrange other systems for protecting persons on board the platform, from crushing against the parts of the guardrail not protected by the non-physical barrier systems described.

The invention claimed is:

1. An aerial work platform, comprising:
a work platform provided with a guardrail;
a lifting mechanism coupled to the work platform;
a control desk on which manual control members are arranged adapted to control movements of the aerial work platform, the desk being designed to be attached removably to the guardrail at various places on the guardrail on the side towards the inside of the platform, the desk being designed to be attached and detached from the guardrail manually without a tool; and
a non-physical barrier system adapted to create a non-physical barrier and to determine, when the desk is attached to the guardrail, that a person on the platform is in the vicinity of a part of the guardrail adjacent to the desk and/or is bent towards the desk by detecting an interference of the person with the non-physical barrier, the system inhibiting at least some movements of the aerial work platform in the event of detection of an interference with the barrier;
wherein the non-physical barrier system comprises at least one wave emitter and a wave receiver arranged on the desk in order to conjointly create the non-physical barrier so that the system detects an interference of an external object with the non-physical barrier because the receiver receives waves emitted by the emitter by reflection on the object interfering with the non-physical barrier; and wherein the non-physical barrier system is supplemented by a photoemitter arranged for emitting a light beam visible to the naked eye that runs along the non-physical barrier so as to indicate to the person the position of the non-physical barrier.

2. An aerial work platform according to claim 1, wherein the non-physical barrier system is designed to determine that the person on the platform is in the vicinity of a part of the guardrail that is adjacent laterally to the desk, the non-physical barrier system inhibiting at least some movements of the aerial work platform in the event of determining that the person on the platform is in the vicinity of the part of the guardrail.

3. An aerial work platform according to claim 1, wherein the emitter emits a wave beam in a given direction.

4. An aerial work platform according to claim 3, wherein the emitter emits in a range of electromagnetic waves comprising ultraviolet, visible light and infrared.

5. An aerial work platform according to claim 1, wherein the emitter and the receiver form a photoelectric detector.

6. An aerial work platform according to claim 1, wherein the desk comprises a manual actuation member the actuation of which prevents the non-physical barrier system from inhibiting the movements of the aerial work platform.

7. An aerial work platform according to claim 1, wherein the photoemitter is part of a complementary non-physical barrier system for detecting that a person on the platform is either in the vicinity of said part of the guardrail adjacent to the desk or is leaning towards the desk by detecting an interference of the person with the complementary non-physical barrier, the complementary non-physical barrier being disposed so that the complementary non-physical barrier system effects the detection either for a proximity of the person to said part of the guardrail or for a leaning of the person towards the desk that is less than for the non-physical barrier system, the complementary non-physical barrier system triggering a signaling device without inhibiting any movement of the aerial work platform in the event of the detecting of the interference with the complementary non-physical barrier.

8. An aerial work platform according to claim 1, wherein the non-physical barrier extends:
   a) either in a zone adjacent to a lateral side of the desk, the non-physical barrier being in a substantially vertical plane parallel to the rear side of the desk;
   b) or in a zone in front of the desk, the non-physical barrier being in a substantially vertical plane perpendicular to the rear side of the desk and located towards a lateral side of the desk.

9. An aerial work platform according to claim 1, wherein the non-physical barrier extends above the desk from the rear thereof while being oriented upwards in a direction of the front of the desk in order to detect that the person is leaning over the desk.

10. An aerial work platform according to claim 1, wherein a maximum detection distance of the non-physical barrier measured from the desk is less than or equal to 100 cm.

11. An aerial work platform according claim 1, wherein the non-physical barrier is invisible to an operator.

12. An aerial work platform according to claim 1, wherein the non-physical barrier is an infrared or ultraviolet barrier.

13. An aerial work platform according to claim 1, wherein the lifting mechanism comprises a scissor lift mounted between a wheeled chassis and the work platform.

14. An aerial work platform, comprising:
   (a) a work platform including a guardrail;
   (b) a lifting mechanism coupled to the work platform; and
   (c) a control desk coupled to the guardrail, the control desk comprising:
      a plurality of controls configured to control movements of the aerial work platform,
      a lateral plate coupled to a first side of the desk and extending substantially vertically from the desk, the lateral plate attaching the desk to the guardrail,
      a first non-physical barrier system configured to be coupled to a second side of the desk opposite the first side and projecting laterally away from the desk, and
      a second non-physical barrier system coupled adjacent to the first side of the desk and projecting laterally beyond a front of the desk;
   (d) the first non-physical barrier system and the second non-physical barrier system being configured to detect an interference and inhibit at least some movements of the aerial work platform in the event of detection of an interference; and
   (e) the first non-physical barrier system and the second non-physical barrier system each comprising at least one wave emitter and a wave receiver; and wherein at least the first non-physical barrier system is supplemented by a photoemitter arranged for emitting a light beam visible to the naked eye that runs along the first non-physical barrier so as to indicate to the person the position of the first non-physical barrier.

15. The aerial work platform of claim 14, wherein the first non-physical barrier system further comprises a first photoelectric detector housing, a photoemitter located in the housing, and a photoreceiver located in the housing.

16. The aerial work platform of claim 14, further comprising a first indicator light and a second indicator light located adjacent to the desk, the first indicator light being configured to indicate an absence of the interference and the second indicator light being configured to indicate a detection of the interference.

17. An aerial work platform, comprising:
   a work platform comprising a guardrail;
   a mobile chassis including wheels;
   a lift configured to move the work platform relative to the mobile chassis;
   a control desk comprising manual control members configured to control movements of the aerial work platform, the desk configured to be removably attached to various sections of the guardrail on a side of the guardrail towards the platform, the desk further configured to be attached and detached from the guardrail without a tool;
   at least two barrier assemblies each comprising a photoemitter and a photodetector located adjacent each other on the same side of a user location, a first of the at least two barrier assemblies deterring at least some movements of the aerial work platform in response to reflected waves from the user location; and the photoemitter in a second of the at least two barrier assemblies arranged for emitting a light beam visible to the naked eye that runs along the first of the barrier assemblies so as to indicate to the person the position of the first barrier assembly; and a maximum detection distance between each of the photoemitter's and the photodetectors being less than or equal to 100 cm.

18. The aerial working platform of claim 17, further comprising a support housing extending above the desk, the barrier assemblies being mounted to the support housing, and an indicator light or an audible signal located on the support housing indicating a detection of interference by the barrier assemblies.

* * * * *